United States Patent [19]

Harja

[11] Patent Number: 4,467,381

[45] Date of Patent: Aug. 21, 1984

[54] TAPE RECORDER HEAD MOVING MECHANISM

[75] Inventor: Arne M. Harja, Bellevue, Wash.

[73] Assignee: Sundstrand Data Control, Inc., unit of Sundstrand Corporation, Redmond, Wash.

[21] Appl. No.: 200,287

[22] Filed: Oct. 24, 1980

[51] Int. Cl.³ .......................... G11B 5/48; G11B 5/55; G11B 21/16; G11B 21/08
[52] U.S. Cl. .................................... 360/106; 360/104
[58] Field of Search ................... 360/106, 104, 77, 78, 360/137; 369/43, 186

[56] References Cited

U.S. PATENT DOCUMENTS

| | | |
|---|---|---|
| 3,080,455 | 3/1963 | Namenyi-Katz .................... 360/106 |
| 3,119,989 | 1/1964 | Wasylenko .......................... 360/106 |
| 3,576,454 | 4/1971 | Beach ................................. 360/106 |
| 4,020,506 | 4/1977 | Barrett ............................... 360/106 |

*Primary Examiner*—Robert M. Kilgore
*Attorney, Agent, or Firm*—Ted E. Killingsworth; Michael B. McMurry; Harold A. Williamson

[57] ABSTRACT

A head moving mechanism for a tape deck provides for accurate shifting of a magnetic head from one set of tracks to another by securing the magnetic head to a head carriage member which in turn is attached to the tape deck by two flexures. A solenoid secured to the head carriage member serves to move the magnetic head by means of a linkage mechanism attached to the tape deck.

9 Claims, 3 Drawing Figures

TAPE RECORDER HEAD MOVING MECHANISM

TECHNICAL FIELD

The invention relates to the field of tape recording equipment and, in particular, to a mechanism for moving a magnetic head between tracks on a magnetic tape.

BACKGROUND OF THE INVENTION

In multitrack recording systems such as audio reproducers used in aircraft entertainment systems wherein a number of tracks are recorded in one direction and a number of tracks are recorded in the other direction, it is very important that when the magnetic head is moved from one set of tracks to another the azimuth orientation of the head with respect to the tracks on the tape be maintained. If azimuth orientation is not maintained within very close tolerance the output of the audio system will be significantly reduced. In addition the head must be moved accurately from the center line of one set of tracks to the center line of the other set of tracks or the audio output will be significantly reduced as well.

SUMMARY OF THE INVENTION

It is therefore an object of the invention to provide a head moving mechanism for a multitrack magnetic tape system wherein the magnetic head is supported by a pair of flexures thereby facilitating limited lateral movement of the head with respect to the tape.

It is another object of the invention to provide a head moving mechanism for use with a multitrack tape magnetic tape system wherein the magnetic head is secured to a head carriage member which in turn is supported on a base member by a pair of flexures thereby facilitating limited lateral movement of the head with respect to the tape while maintaining the original azimuth orientation of the head gap. A solenoid secured to the carriage member and connected to the base member by means of a linkage member is effective to move the head in the lateral direction.

DETAILED DESCRIPTION OF THE INVENTION

Figure 1:
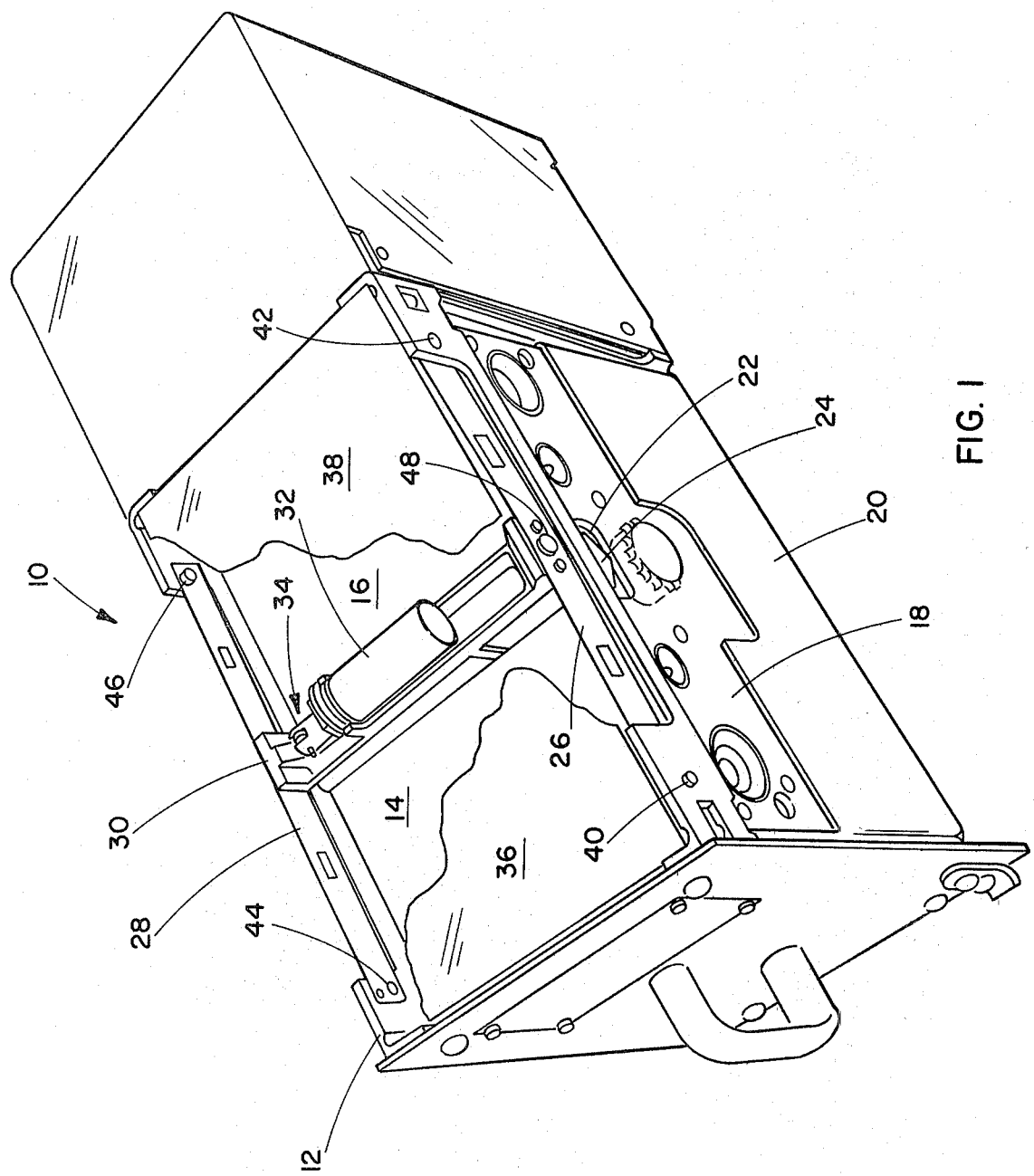
FIG. 1 is a perspective view of a magnetic tape system.

In FIG. 1 of the drawings is illustrated a tape deck 10 having a support structure 12 which includes a pair of support plates 14 and 16. The tape deck 10 includes a cassette 18 secured to the deck by means of a drawer 20. Motors driving tape reels and capstans (not shown) in the cassette cause a magnetic tape 22 to be driven over a magnetic head 24. In the preferred embodiment of the invention the magnetic tape 22 has a one inch width and includes one set of 12 tracks recorded in one direction and another set of 12 tracks recorded in the other direction longitudinally on the tape with the tracks one set interleaved with the tracks of the other set. The magnetic head 24 includes 12 pick up portions spaced so as to correspond to one set of tracks.

Secured to each end of the support structure 12 are two flexures 26 and 28. Attached to approximately the mid point of the flexures 26 and 28 is a head carriage member 30 to which the magnetic head 24 is secured.

Mounted on the head carriage member 30 is a solenoid 32 which by means of a linkage mechanism indicated generally at 34 causes the magnetic head 24 to move laterally with respect to the tape 22 resulting in the magnetic head shifting from one set of 12 tracks to the other. The linkage mechanism 34 is illustrated in more detail in FIGS. 2 and 3.

The tape deck 10 also includes plates 36 and 38 secured to the support structure 12 which can serve as printed circuit boards for electronics. The flexures 26 and 28 are secured to the support structure 12 by means of fastening devices 40, 42, 44 and 46.

Figure 2:
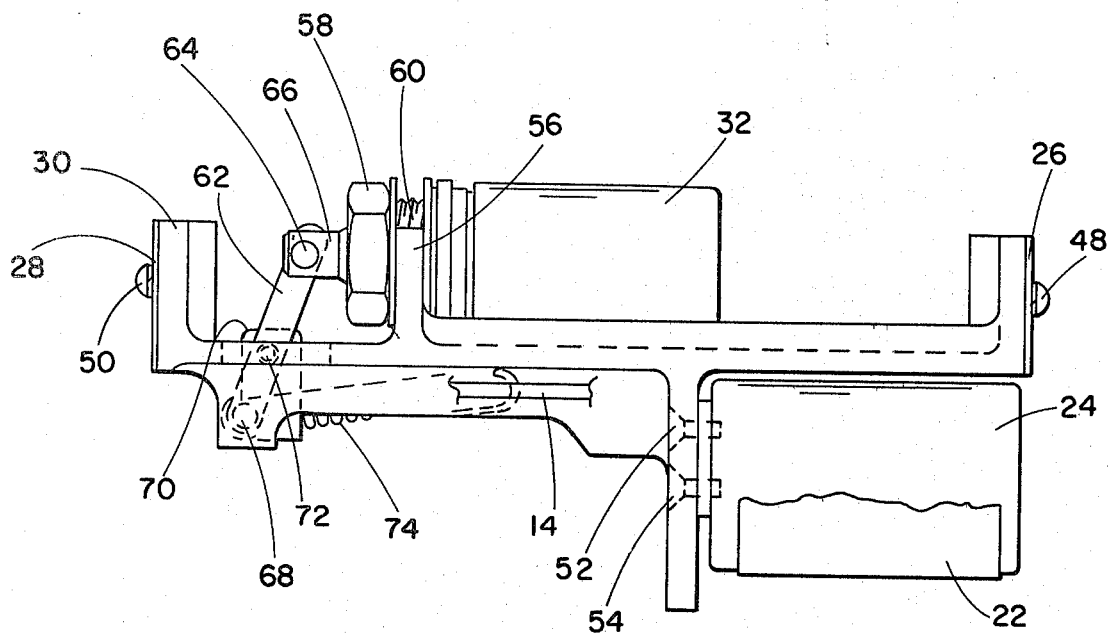
FIG. 2 is a side view of a head carriage member.
Figure 3:
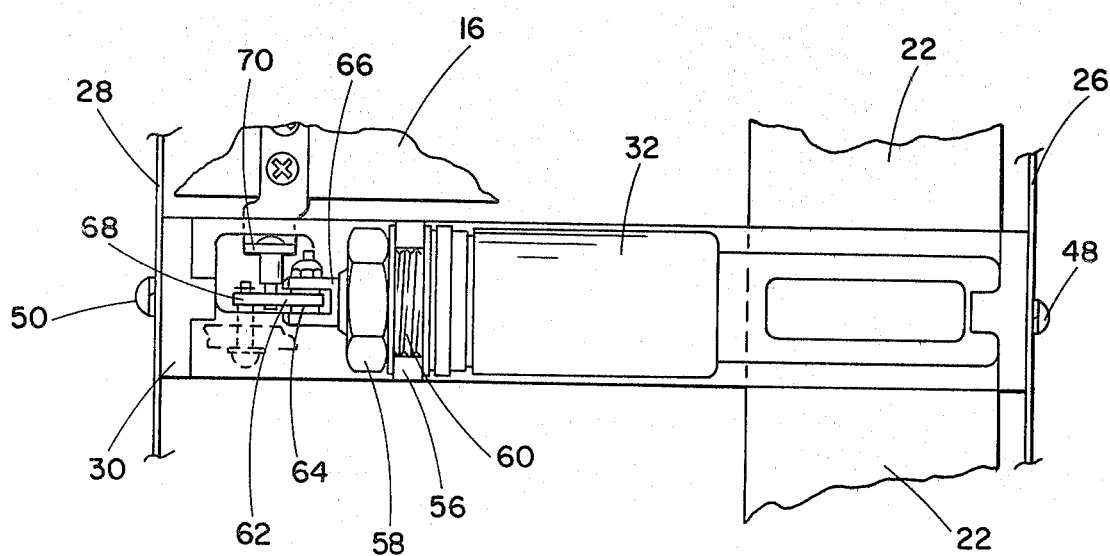
FIG. 3 is a top view of the head carriage member.

A side view of the head carriage member is provided in FIG. 2 and a top view is provided in FIG. 3. The flexures 26 and 28 are secured to the support structure by means of fastening devices 48 and 50. The magnetic head 24 is attached to the support structure with fastening devices 52 and 54.

The head moving mechanism is controlled by the solenoid 32. The solenoid is attached to a U-shaped portion 56 of the support structure 12 by means of a nut 58 screwed on a threaded shaft 60 of the solenoid 32.

Linkage mechanism 34 includes a linkage member 62 atached at one end by a pivot 64 to the plunger 66 of the solenoid 32. The other end of the linkage member 62 is attached by means of a pivot 68 to the carriage member 12. Attached to support plate 16 is a support bracket 70 that serves to support of a pivot 72 to which the linkage member 62 is rotationally attached. When the solenoid is energized and the plunger 66 moves to the right in FIG. 2 the linkage member will rotate about the fixed pivot 72 thereby causing the head carriage member 30 and hence the magnetic head to move to the left with respect to the tape 24.

In order to retain the head carriage member 30 to the right with respect to the tape 24 a biasing element, in this case a spring 74 is attached to the pivot 68 on carriage member 30 and to the support plate 14.

I claim:

1. A tape deck comprising:
    magnetic tape including a first and a second set of tracks;
    tape transport means for moving said tape in a predetermined direction;
    a support structure secured to said tape transport means;
    a first flexure secured at each end to said support structure generally parallel to the direction of tape movement;
    a second flexure secured at each end to said support structure spaced apart and generally parallel to said first flexure;
    a head carriage member secured to said first and second flexures;
    a magnetic head secured to said head carriage member such that said magnetic head is disposed to the first set of said tape tracks; and
    means secured to both said base member and said head carriage member for moving said carriage in a direction perpendicular to the direction of tape movement resulting in the magnetic head moving from one of said set of tape tracks to the other.

2. The tape deck of claim 1 wherein said carriage moving means includes a solenoid secured to said carriage member.

3. The tape deck of claim 2 wherein said carriage moving means includes a linkage member pivotly connected to said solenoid and to said support structure.

4. The tape deck of claim 3 wherein said linkage member is connected to said support structure by a spring element that serves to retain said magnetic head in alignment with said first set of tracks when the solenoid is not energized.

5. The tape deck of claim 1, 2, 3 or 4 wherein said head carriage member is secured approximately midway between the ends of each of said flexures.

6. A tape deck head moving mechanism comprising:
a support structure;
a pair of spaced apart, parallel planar member flexures secured at each end to said support structure;
a head carriage member secured approximately midway between the ends of each of said planar member flexures; and
means for moving said carriage in a direction perpendicular to said planar member flexures.

7. The mechanism of claim 6 wherein said carriage moving means includes a solenoid.

8. The mechanism of claim 7 including means for biasing said head carriage member in one direction when said solenoid is not energized.

9. The mechanism of claim 8 wherein said solenoid is secured to said head carriage member and said carriage moving means includes a linkage mechanism operatively connected to both said solenoid and said support structure.

* * * * *